United States Patent [19]

Savage, Jr.

[11] Patent Number: 5,466,174
[45] Date of Patent: Nov. 14, 1995

[54] APPARATUS TO CONNECT LEDS AT DISPLAY PANEL TO CIRCUIT BOARD

[76] Inventor: John M. Savage, Jr., 538-B Via De La Valle, Solana Beach, Calif. 92075

[21] Appl. No.: 142,938

[22] Filed: Oct. 29, 1993

Related U.S. Application Data

[63] Continuation-in-part of Ser. No. 82,963, Jun. 29, 1993, Pat. No. 5,368,503.

[51] Int. Cl.⁶ .................................................. H01R 13/506
[52] U.S. Cl. .................................... 439/596; 439/918
[58] Field of Search .................................. 439/466, 596, 439/356, 502, 918; 362/226

[56] References Cited

U.S. PATENT DOCUMENTS

| | | | |
|---|---|---|---|
| D. 200,157 | 1/1965 | Vincent | D26/10 |
| 1,747,896 | 2/1930 | Gates . | |
| 2,042,199 | 5/1936 | Thomas . | |
| 2,396,725 | 3/1946 | Thomas, Jr. . | |
| 2,796,593 | 6/1957 | Offerman . | |
| 2,829,359 | 4/1958 | Ritter . | |
| 2,949,595 | 8/1960 | Doeleman | 439/551 |
| 2,951,226 | 8/1960 | Gittens | 439/58 |
| 2,977,562 | 3/1961 | Benson . | |
| 2,999,895 | 9/1961 | Smith . | |
| 3,184,536 | 5/1965 | Vincent . | |
| 3,335,387 | 8/1967 | Mueller | 439/56 |
| 3,601,786 | 8/1971 | Brubaker | 439/853 |
| 3,621,445 | 11/1971 | Horecky | 439/81 |
| 3,663,931 | 5/1972 | Brown | 439/885 |
| 3,887,803 | 6/1975 | Savage, Jr. | 174/138 G |
| 3,975,072 | 8/1976 | Ammon | 439/78 |
| 4,035,681 | 7/1977 | Savage, Jr. . | |
| 4,195,330 | 3/1980 | Savage, Jr. | 362/226 |
| 4,219,172 | 8/1980 | Murayama | 248/27.3 |
| 4,230,387 | 10/1980 | Zahn | 439/357 |
| 4,398,240 | 8/1983 | Savage, Jr. | 362/226 |
| 4,402,110 | 9/1983 | Savage, Jr. | 16/225 |
| 4,471,414 | 9/1984 | Savage, Jr. | 362/226 |
| 4,491,900 | 1/1985 | Savage, Jr. | 362/226 |
| 4,513,356 | 4/1985 | Mikola | 439/918 |
| 4,727,648 | 3/1988 | Savage, Jr. | 362/226 |
| 4,821,152 | 4/1989 | Lorenzen | 174/138 G |
| 4,837,927 | 6/1989 | Savage, Jr. | 29/839 |
| 4,986,772 | 1/1991 | Fukutani | 439/892 |
| 5,068,771 | 11/1991 | Savage, Jr. | 362/255 |
| 5,071,375 | 12/1991 | Savage, Jr. | 439/853 |
| 5,288,242 | 2/1994 | Muzslay | 439/596 |

FOREIGN PATENT DOCUMENTS

| | | |
|---|---|---|
| 2390032 | 12/1978 | France . |
| 1464176 | 2/1969 | Germany . |
| 2250007 | 5/1974 | Germany . |
| 2918620 | 11/1980 | Germany . |
| 2081516 | 2/1982 | United Kingdom . |

*Primary Examiner*—Neil Abrams
*Attorney, Agent, or Firm*—William W. Haefliger

[57] ABSTRACT

An apparatus to connect an LED to a post of a printed circuit board, the LED having at least one terminal, comprising a terminal connector having a first end connectible to the board post, and a second end electrically connectible to circuitry leading to the LED terminal; the first and second ends projecting in directions A and B, respectively, when A and B define an angle less than 180°; and housing structure for the terminal connector having housing extents projecting in the A and B directions, and a housing cap removably connectible to one of the housing extents.

17 Claims, 7 Drawing Sheets

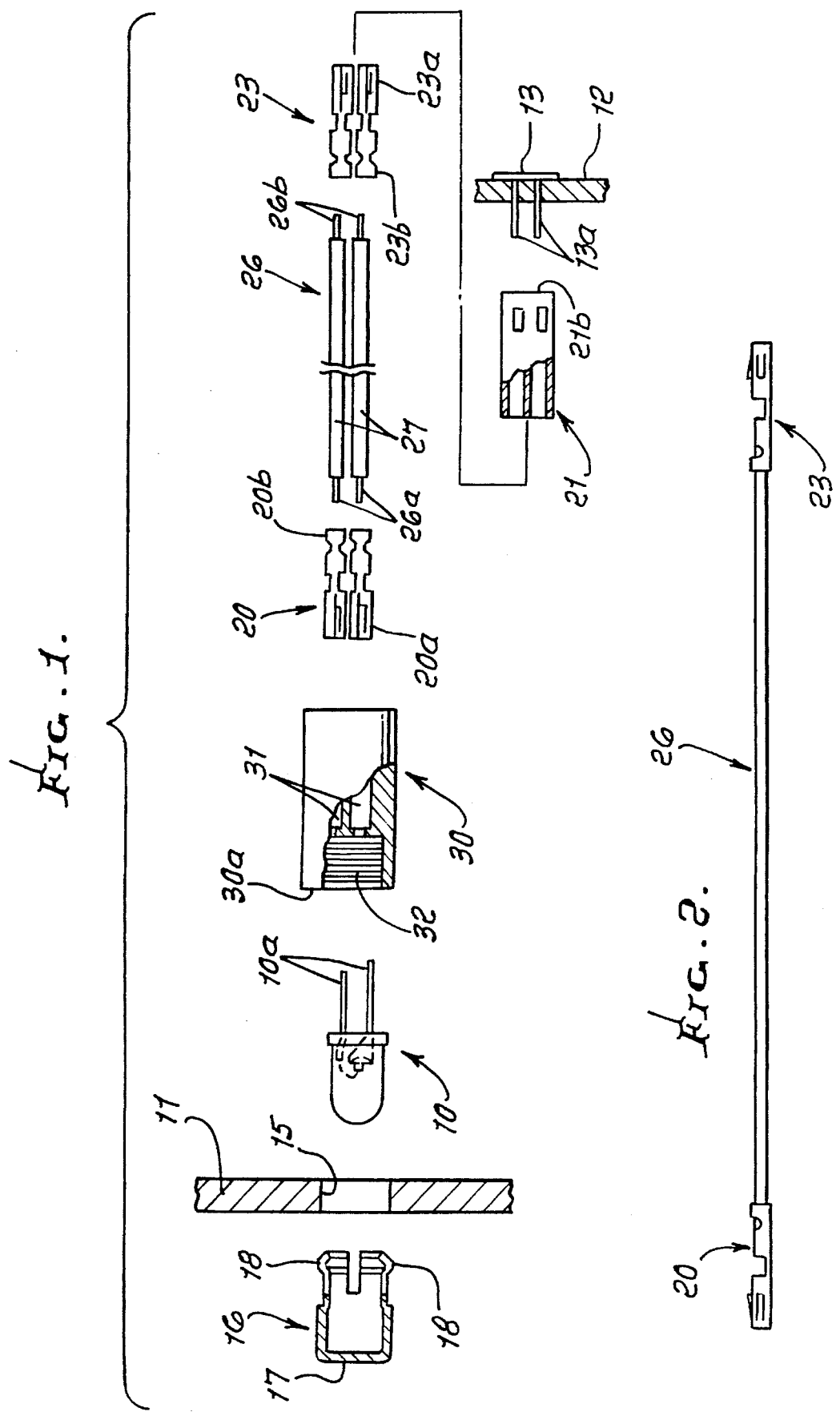

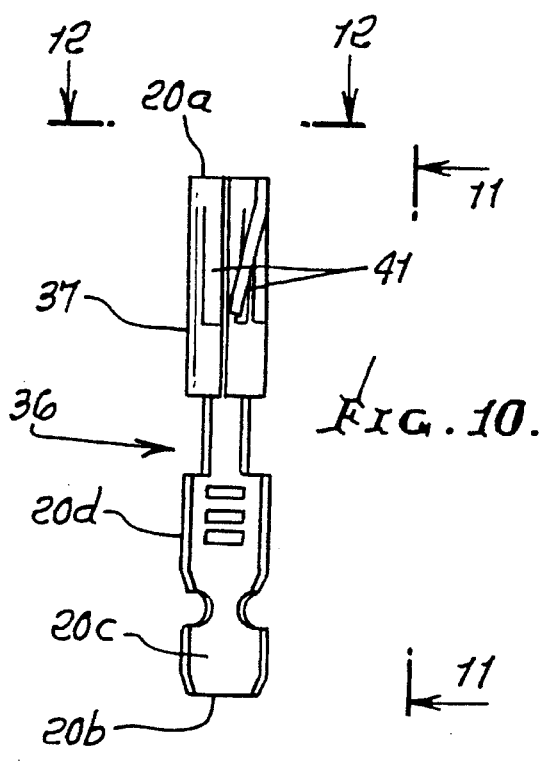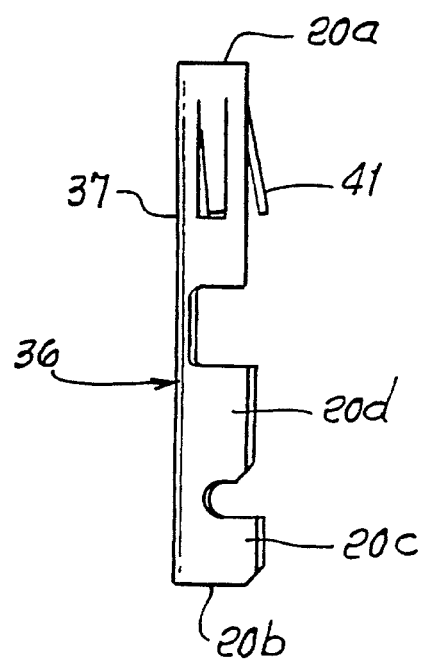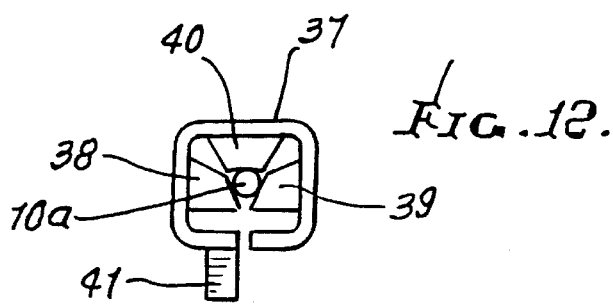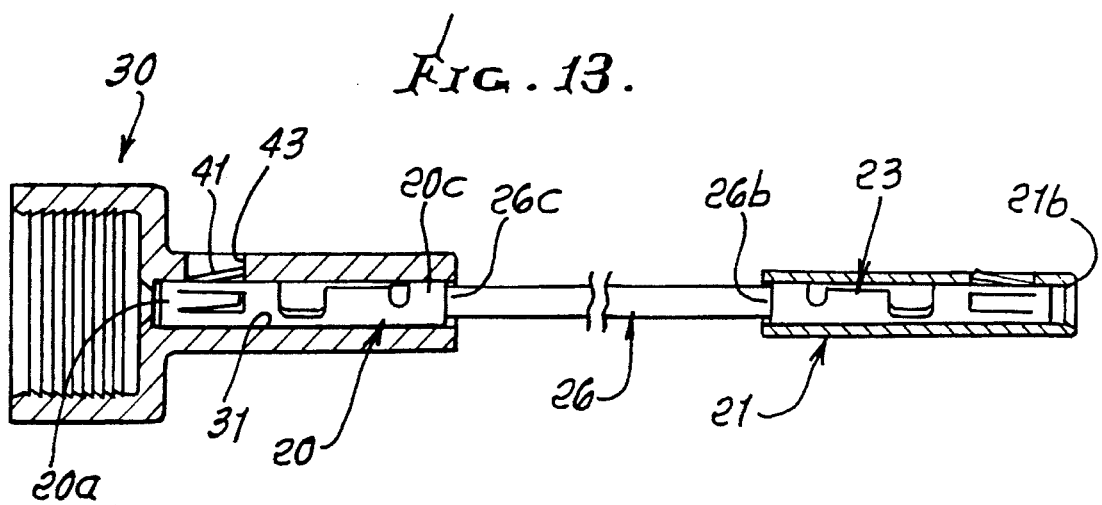

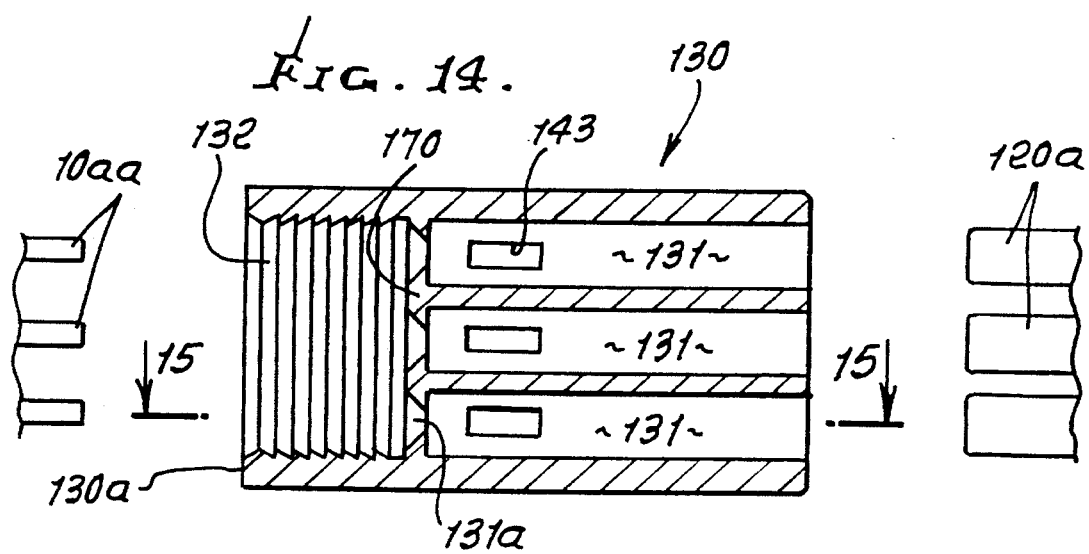
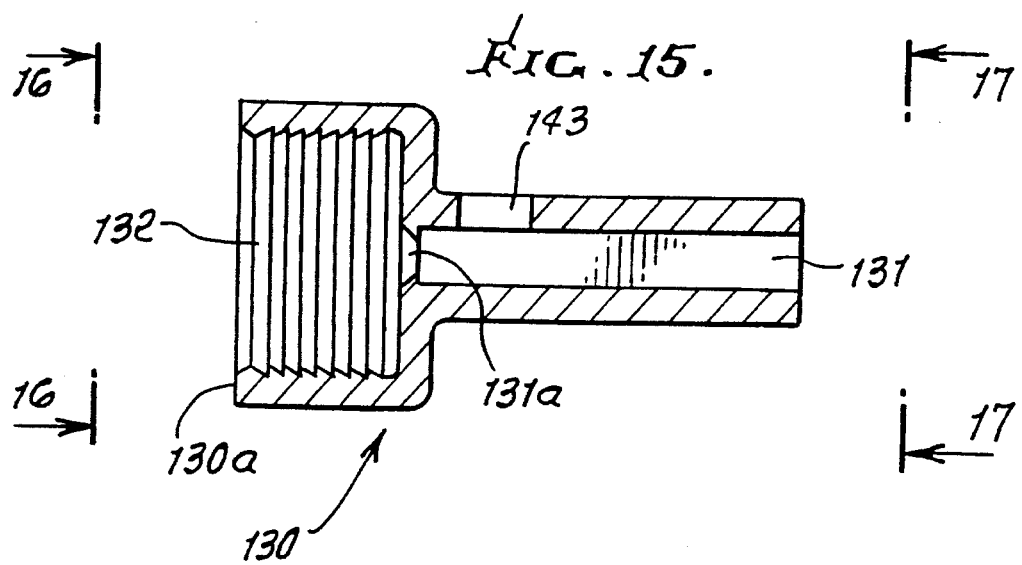
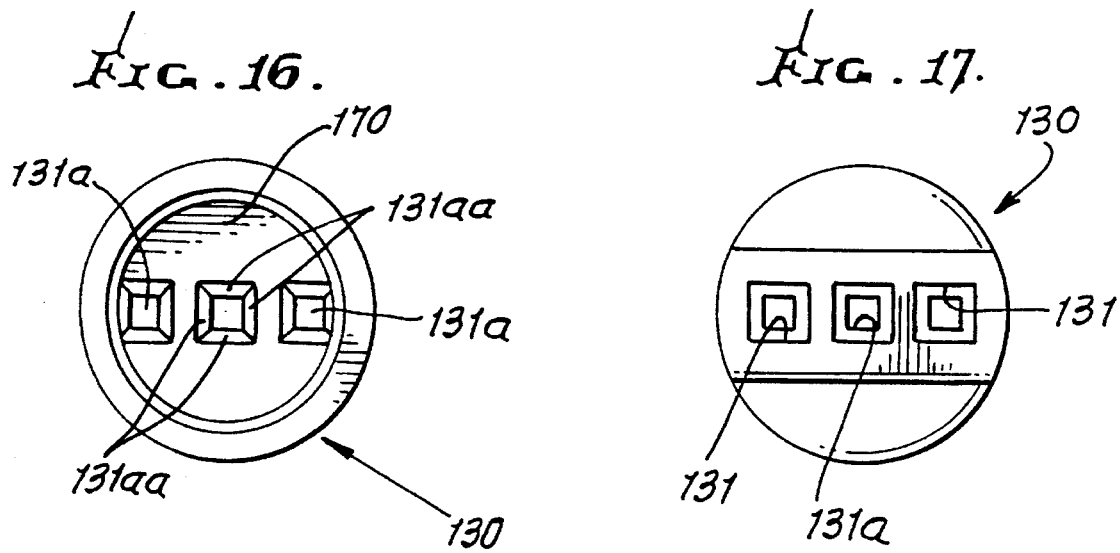

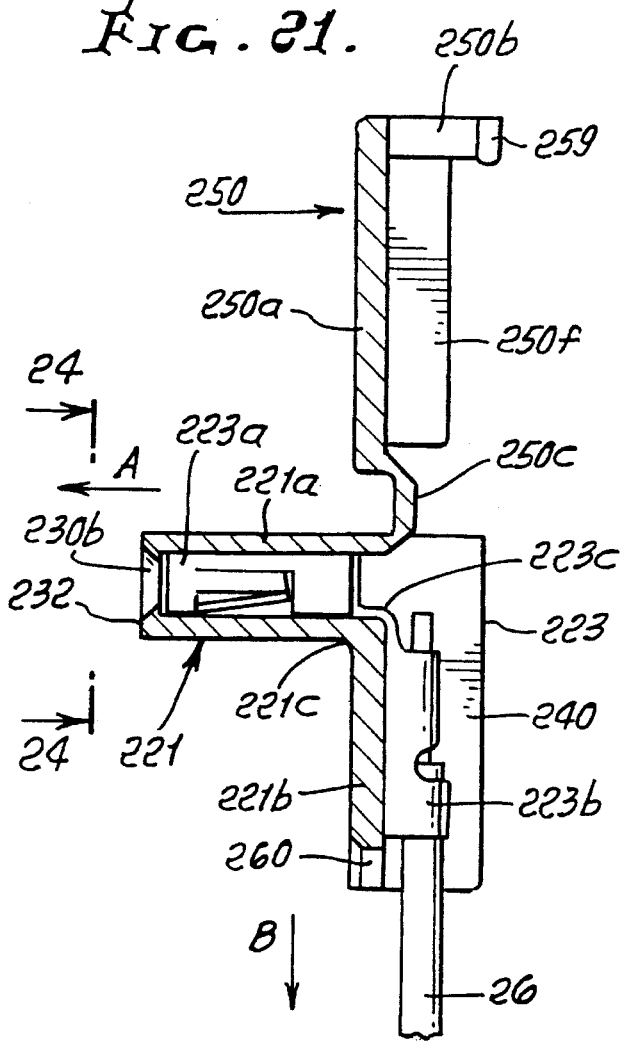
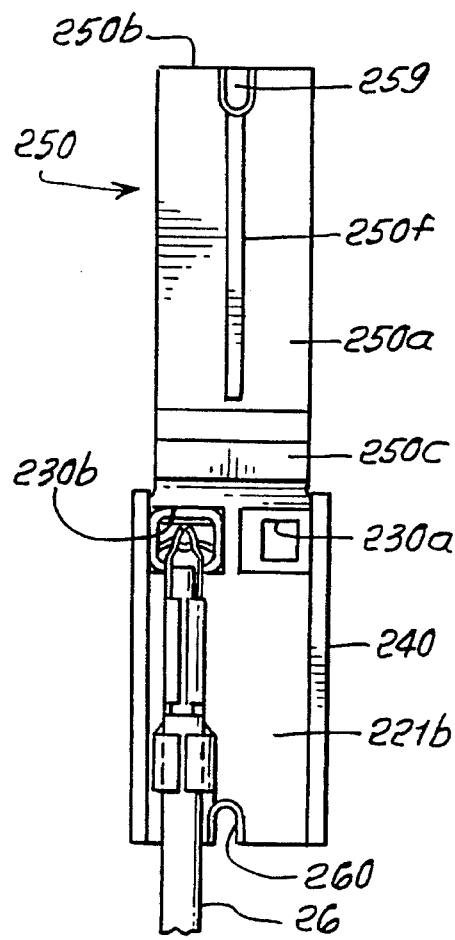
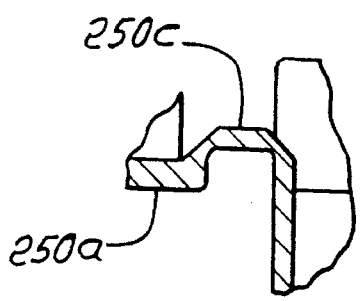
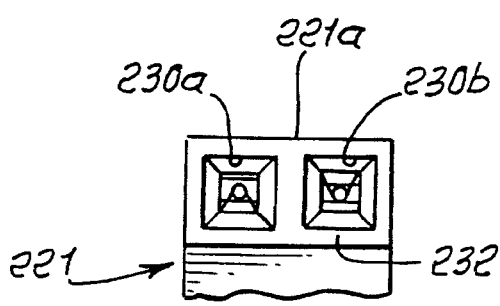

5,466,174

APPARATUS TO CONNECT LEDS AT DISPLAY PANEL TO CIRCUIT BOARD

This application is a continuation-in-part of Ser. No. 08/082,963 filed Jun. 29, 1993, now U.S. Pat. No. 5,368,503.

BACKGROUND OF THE INVENTION

This invention relates generally to connection of LEDs to printed circuit boards (PCBs); and more particularly to a simple, effective mounting apparatus with interchangeable components.

There is need for mounting apparatus of the type referred to, and in particular, there is need for such apparatus in which components are easily assembled, end-to-end, and remain assembled, with certain components being interchangeable. Stable mounting of such mounting apparatus to a display panel and to a PCB is also desired and needed.

SUMMARY OF THE INVENTION

It is a major object of the present invention to provide improved apparatus meeting the above needs. Basically, the apparatus of the invention comprises:

a) a terminal connector having a first end connectible to the board post, and a second end electrically connectible to the LED terminal, b) the first and second ends projecting in directions A and B, respectively, where A and B define an angle less than 180°, c) and housing means for the terminal connector having housing extents projecting in the A and B directions, and a housing cap removably connectible to one of the housing extents.

As will be seen, the first and second ends of a second terminal connector project in directions A and B to define an angle less than 180°, that angle for example being about 90°. A housing for those ends projects in directions A and B, and a housing cap seals off one side of the housing extent projecting in one of those directions.

Another object is to provide a panel connector to telescopically receive the first terminal connectors. Typically, a lens for the LED has spring fingers attached to the LED, and surfaces to mount the panel connector; and the panel defines an opening to pass the lens spring fingers and to which the panel connector is attached via the LED.

A further object is to provide the first terminal connector's first ends with grip fingers to receive the LED terminals, and the second terminal connector's first ends with grip fingers to receive the terminal posts. Typically, the grip fingers of the terminal connectors are alike whereby the first and second terminal connectors are interchangeable.

Other objects include the provision of panel connector and PCB connector components with like openings to receive like terminal contacts, at opposite ends of cables connected to the contacts, as will be seen. Accordingly, only a few standardized components are needed to establish a simple, effective connection between LEDs and printed circuit board posts.

These and other objects and advantages of the invention, as well as the details of an illustrative embodiment, will be more fully understood from the following specification and drawings, in which:

DRAWING DESCRIPTION

FIG. 1 is a top plan view of an exploded assembly of components to connect an LED display panel to circuitry on a printed circuit board;

FIG. 2 is a side view of certain of the FIG. 1 components;

Figure 3:
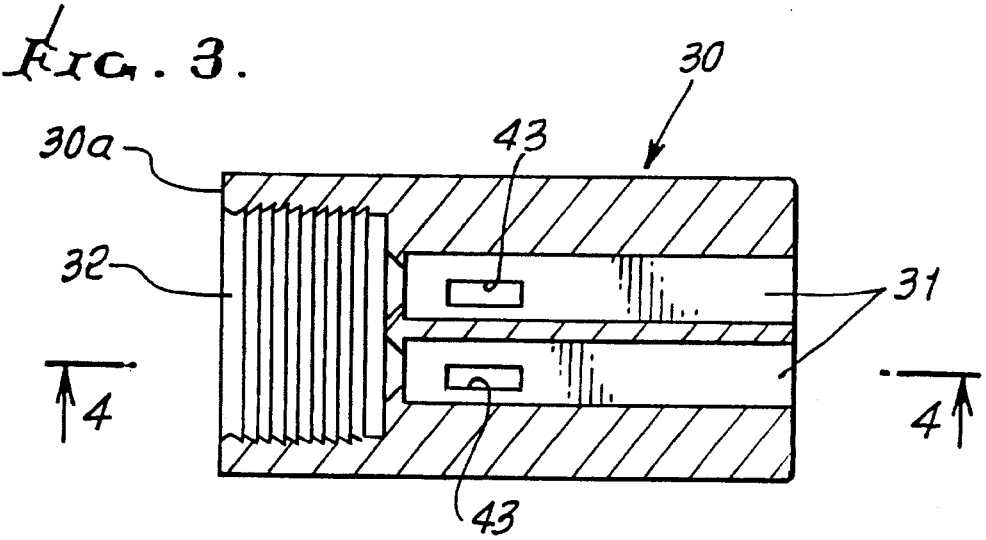
FIG. 3 is an enlarged top plan view of a panel connector, in section, as seen in FIG. 1.
Figure 4:
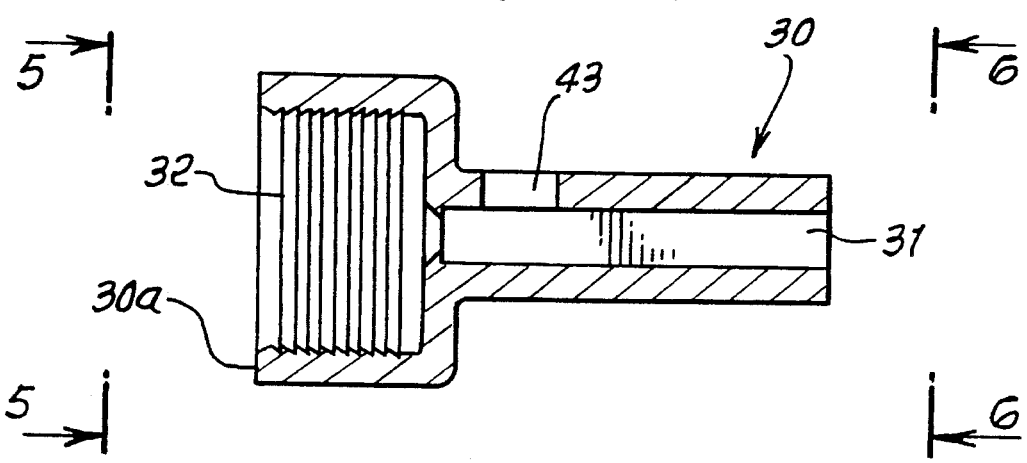
FIG. 4 is an edge view of the FIG. 3 panel connector, taken in section on lines 4—4 of FIG. 3.
Figure 5:
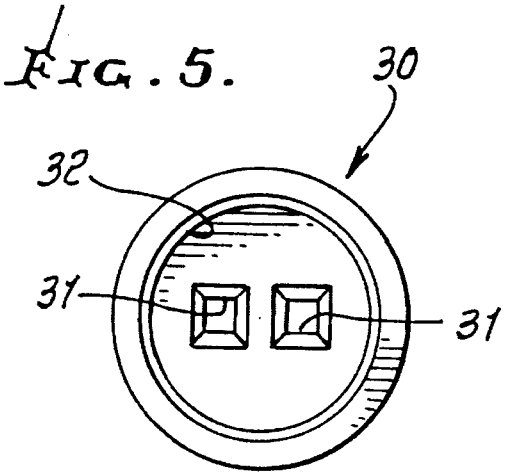
FIG. 5 is an end view taken on lines 5—5 of FIG. 4.
Figure 6:
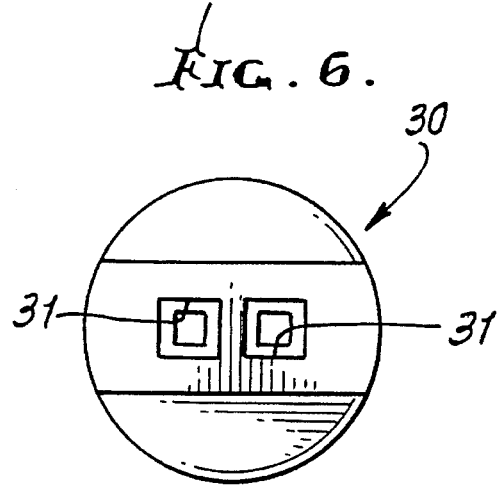
FIG. 6 is an end view taken on lines 6—6 of FIG. 4.
Figure 7:
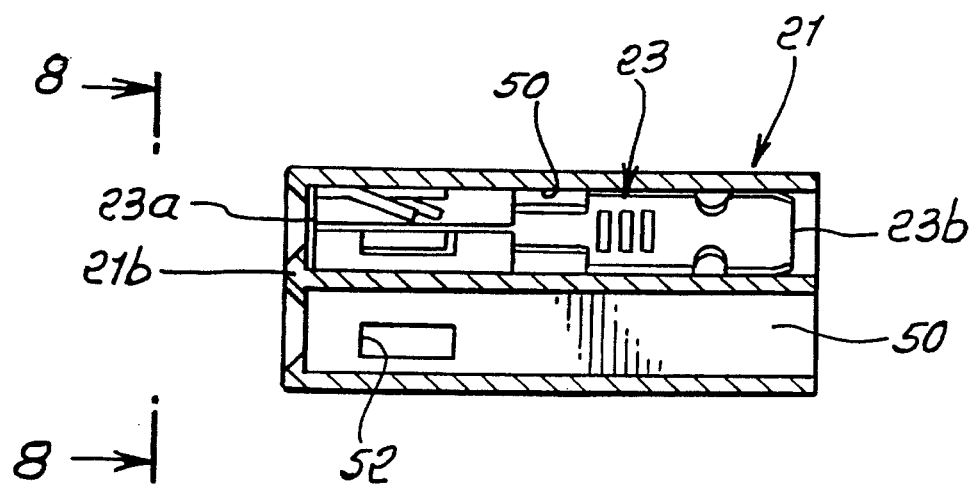
FIG. 7 is an enlarged top plan view of a PCB connector unit, in section, as seen in FIG. 1, and showing one contact in place.
Figure 9:
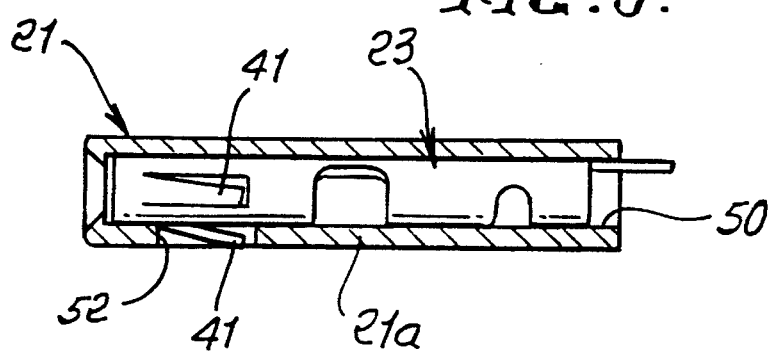
Figure 18:
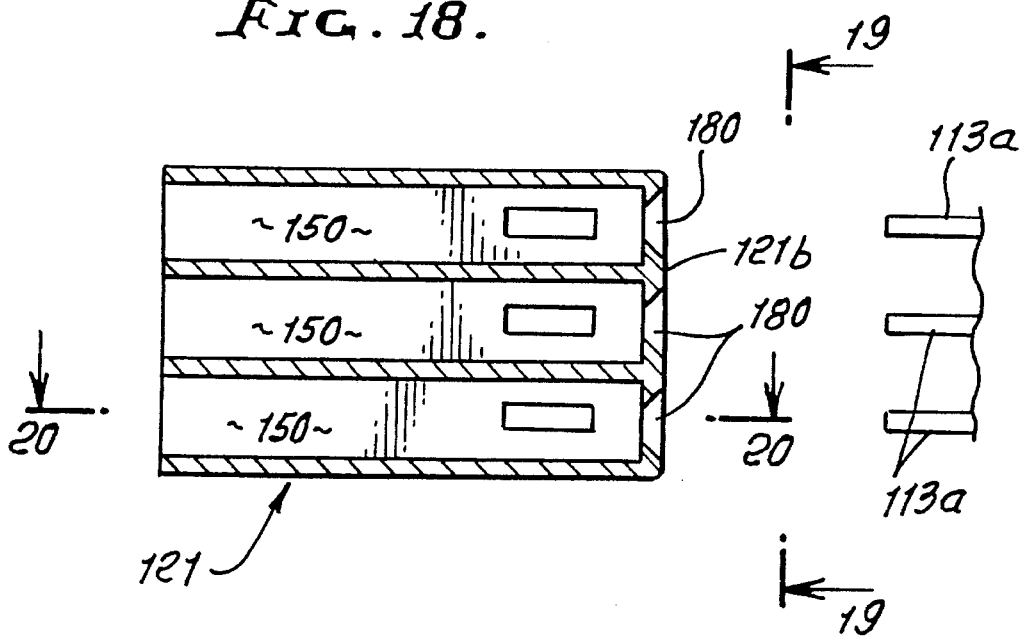
Figure 19:
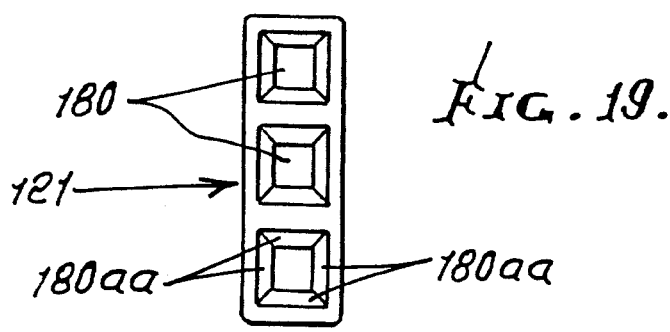
Figure 20:
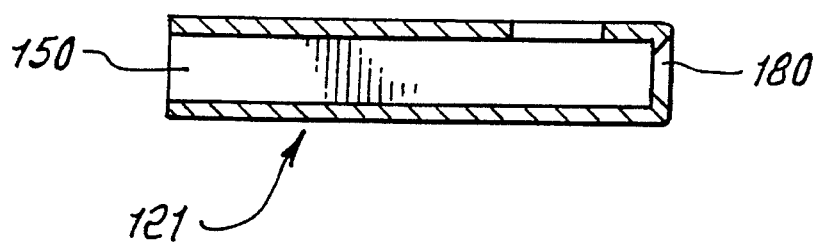

FIG. 9 a schematic view showing a contact positioned in the PCB connector unit;

FIG. 10 is a front view of the contact seen in FIG. 9;

FIG. 11 is a side view taken on lines 11—11 of FIG. 10;

FIG. 12 is an end view taken on lines 12—12 of FIG. 10;

FIG. 13 is a side view taken in section showing like terminal contacts as received endwise in the panel connector unit, and the PCB connector, of FIG. 1;

FIG. 14 is a view like FIG. 3 showing a three terminal panel connector, in section;

FIG. 15 is an edge view of the FIG. 14 panel connector, taken in section on lines 15—15 of FIG. 14;

FIG. 16 is an end view taken on lines 16—16 of FIG. 15;

FIG. 17 is an end view taken on lines 17—17 of FIG. 15;

FIG. 18 is a view like FIG. 7 showing a three contact-receiving PCB connector unit, in section;

FIG. 19 is an end view taken on lines 19—19 of FIG. 18;

FIG. 20 is a view taken in section on lines 20—20 of FIG. 18;

FIG. 21 is a section taken through a housing for a modified second terminal connector, the housing having legs extending in two directions, there being a removable cap for one leg of the housing;

FIG. 22 is a side view taken on lines 22—22 of FIG. 21;

FIG. 23 is a fragmentary section showing another view of a hinge connection of a cap to the housing of FIG. 21; and FIG. 24 is an end view taken on lines 24—24 of FIG. 21.

DETAILED DESCRIPTION

In FIG. 1, apparatus is provided to connect an LED 10 received in a display panel 11, to circuitry on a printed circuit board schematically shown at 12. Circuitry on the latter appears at 13, and may include wire wound posts 13a. The connection of the LED to the display panel 11, via opening 15 therein, is facilitated by a lens unit 16 incorporating a light-transmitting lens 17 and spring fingers 18 which receive the LED and hold the LED to the panel 11. See for example U.S. Pat. No. 5,071,375 to Savage, incorporated herein by reference.

The apparatus shown in FIG. 1 includes first terminal connectors 20 having first ends 20a connectible to LED terminals 10a. Connectors 20 also have second and oppositely extending ends 20b. The apparatus also includes a printed circuit board connector unit 21 connectible to the terminal post or posts 13a on or associated with the PCB board. Second terminal connectors 23 are also provided to have first ends 23a connectible to the unit 21, and second ends 23b which extend oppositely from ends 23a, as shown. The first and second terminal connectors are typically alike, and thus are interchangeable, to simplify the packaging and assembly of the apparatus shown, and to enhance its integrity.

Finally, the apparatus of FIG. 1 includes cable 26 having oppositely extending wire ends 26a and 26b, protruding from insulative sheathing 27. The wire ends 26a are insertible into and thus connectible to second ends 20b of terminal connectors 20; and wire ends 26b are likewise connectible to second ends 23b of terminal connectors 23. Also provided is a panel connector 30 defining parallel openings 31 to closely receive the LED terminals 10a as well as the first ends 20a of terminal connectors 20 to which those LED terminals are attached. An enlarged opening 32 in the panel connector 30 is receivable over and attachable to the spring fingers 18 protruding rightwardly from the panel 11, in the manner described in U.S. Pat. No. 5,071,375 referred to above. The bore of opening 32 is serrated to provide ratchet attachment to the spring fingers. Flat left end 30a of connector 30 flatly engages the right face of panel 11, for stability, whereby elements 16, 10, 30, and 20 are stably mounted to the panel 11, and cable 26 may flex as it extends between 20 and 23. LED terminal pins 10a penetrate into 31 for tight reception-connection between fingers associated with ends 20a.

PCB connector 21 has a flat end 21b to engage the left face of board 12, for stability, whereby elements 21 and 23 are stably mounted to the board, and cable 26 may flex, as described. Pins 13a penetrate openings in 21 for tight reception-connection between three fingers associated with ends 23a.

FIGS. 3–6 show details of the openings 31 in connector 30, as well as the enlarged serrated bore opening 32.

FIG. 13 shows a terminal contact 20 as fully received in one of the square cross section openings 31, the contact structure more fully shown in FIGS. 10–12. The contact 20 is formed from a sheet of metal of predetermined thickness, stamped to form a body 36 between end 20a and end 20b. End 20a is formed by a loop-shaped part 37 with three cantilever fingers 38–40 protruding for contact with sides of a terminal 10a to frictionally grip or retain same. End 20b is formed by U-shaped body structure that closely or frictionally fits within the square cross section walls of opening 31, as seen in FIG. 13, to hold or retain the terminal 20 in that opening 31, and also to grip cable 26 at fold 20c and to grip the wire end 26c of a cable wire, at fold 20d.

A stamped, cantilever finger 41 on the body is shown protruding outwardly in FIG. 13, and into a slot 43 formed in connector 30, to hold the terminal 20 against rightward withdrawal from 30, as seen in FIG. 13. Multiple such retention fingers 41 are shown in FIGS. 10 and 11, for reception in multiple slots 43.

Figure 8:
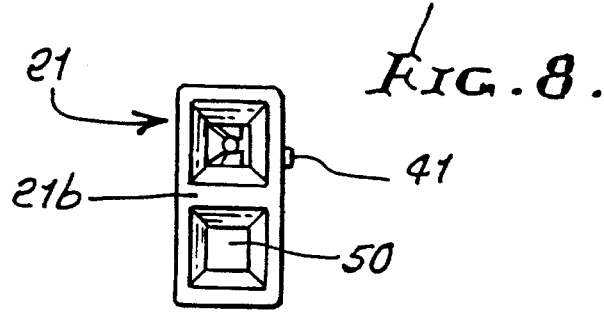
FIG. 8 is an end view taken on lines 8—8 of FIG. 7.

FIG. 7–9 show details of openings 50 in connector 21. A terminal contact 23 is shown as closely received in one of the square cross section openings 50. Contact 23 has the same construction as shown in FIGS. 10–12. A slot or slots 52 formed in the wall 21a of the connector 21, receive a finger 41 or fingers on the terminal 23, to hold that terminal against endwise withdrawal from 21. Multiple such fingers and slots may be provided. The terminal ends at 23b have the same structure as terminal ends 20b, to grips the wire ends 26b of the cable. End 23a of the contact is like end 20a and grips a terminal post 13a.

Accordingly, a simple, effective assembly is provided with optimum mounting stability for a minimum of parts, terminal components being alike and interchangeable.

Referring to FIGS. 14–17, the three terminal-receiving panel connector 130 has the same general construction as that shown in FIGS. 3–6, and corresponding elements bear corresponding numerals, the numerals in FIGS. 14–17 preceded by a "1". Internal wall 170 in FIG. 14 forms three through openings 131a, for passing three terminals 10aa of an LED (i.e., three terminal-type LED, corresponding to LED 10). There are three openings or chambers 131 in a row and having square cross-section walls to hold or retain the three ends 120a of a terminal like that at 20 in FIG. 1. Those terminals electrically connect to the three wires of a cable, like that at 26 in FIG. 1.

Referring to FIGS. 18–20, the three terminal-receiving PCB connector 121 has the same general construction as that shown in FIGS. 7–9, and corresponding elements bear corresponding numbers, except that the numbers in FIGS. 18–20 are preceded by a "1". The connector has three elongated and parallel openings or chambers 150 which have square cross sections to receive square cross-section ends or contacts which are like those at 23a in FIG. 1. Flat end wall 121b contains three through openings 180 to pass three pins 131a corresponding to pins 113a in FIG. 1.

Openings 131a and 180 have four beveled edges 131aa and 180aa, as shown, and arranged in square relation.

Referring now to the modified "second connector 223 shown in FIG. 21, it corresponds to the connector 23 described above, except that leg 223a (corresponding to 23a in FIG. 1) extends in a direction A, whereas leg 223b extends in a direction B. Those directions define an angle less than 180°, and typically that angle is 90° or about 90°, as shown, i.e., an L-shape. Terminal leg or end 223a is telescopically connectible to one or more terminal posts, as for example posts 13a in FIG. 1; and leg or end 223b defines a box terminal connectible to a wire 26 terminal end 26b.

Housing means 221 for the L-shaped connector 223 includes housing leg 221a extending in direction A, and leg 221b extending in direction B. The housing has insulative walls, as shown. Leg 221a defines end openings 230a and 230b, as seen in FIG. 24, to receive two posts as referred to. The end wall 232 of leg 221a is flat to flatly engage the circuit board.

The housing leg 221b is closed along its inward side, but open along its elongated outward side. See elongated side opening 240. That opening facilitates connection of wire 26 to box terminal 223b, and crimping of the latter sidewardly over the wire. Housing inner corner 221c is rounded to locate the rounded bend 223c in the connector 223.

A housing cap 250 may be integrally molded with the housing, to be removably connectible to one of the housing elongated extents or legs, as for example to close the elongated opening 240. As shown, the cap has an elongated side wall 250a, an end closure 250b at the outer or free end of wall 250a, and an integral hinge 250c at the end of wall 250a closest to leg 221a. The hinge is U-shaped to allow swinging of the cap through about 180° to close the side opening 240, as when male part 259 on end closure 250b snap attaches to female connector 260 on the housing leg 221b. A tongue and groove connection may then be formed. The housing is then in made up condition, the configuration allowing cap closure without disturbing the circuit board, or connection of the board post to connector leg 223a. Cap 250 also has opposed side walls 250e and 250f attached to 250a, to enclose wire 26 as walls 250e and 250f embrace 221b. See FIG. 21.

As is clear from the drawings, the cap has removable connection with the housing extent projecting in direction B, said cap having hinge connection to an end of the housing extent projecting in direction A, and at a location spaced from said first and second ends of the terminal connector, said housing extent projecting in said B direction having a sideward opening to sidewardly expose said second terminal connector, and said housing cap being elongated to cover said sideward opening, said hinge connection being in substantial alignment with a wall of said housing extent projecting in direction A, when the cap is closed to cover said sideward opening.

I claim:

1. In apparatus to connect an LED to a post of a printed circuit board, the LED having at least one terminal, the combination comprising:

a) a terminal connector having a first end connectible to the board post, and a second end electrically connectible to circuitry leading to the LED terminal, b) said first and second ends projecting in directions A and B, respectively, where A and B define an angle less than 180°, c) and L-shaped housing means for said terminal connector having housing extents projecting in said A and B directions, and a housing cap removably connectible to one of said housing extents, d) said cap having removable connection with the housing extent projecting in direction B, said cap having hinge connection to an end of the housing extent projecting in direction A, and at a location spaced from said first and second ends of the terminal connector, said housing extent projecting in said B direction having a sideward opening to sidewardly expose said second terminal connector, and said housing cap being elongated to cover said sideward opening, e) said hinge connection being in substantial alignment with a wall of said housing extent projecting in direction A, when the cap is closed to cover said sideward opening.

2. The combination of claim 1 wherein said angle is about 90°.

3. The combination of claim 1 wherein said cap and housing means consist of synthetic resinous material.

4. The combination of claim 1 wherein said cap has tongue and groove removable connection to said housing means proximate said second end of the terminal connection.

5. The combination of claim 1 wherein said elongated cap has an end portion attached via said hinge connection to the housing extent projecting in said A direction.

6. The combination of claim 5 wherein said housing has two legs respectively extending in said A and B directions, said legs defining an L-shape.

7. The combination of claim 1 wherein said cap and housing means consist of synthetic resinous material.

8. The combination of claim 1 wherein said cap has tongue and groove removable connection to said housing means proximate said second end of the terminal connection.

9. In apparatus to connect an LED to a post of a circuit board, the LED having at least one terminal, the combination comprising:

a) a first terminal connector having a first end connectible to the LED one terminal, and a second end, b) a second terminal connector having a first end connectible to said post, and a second end, c) a printed circuit board connector unit to telescopically receive the second terminal connector, d) the first and second terminal connectors being alike, e) and cable having opposite ends to which the second ends of the first and second terminal connectors are connectible, f) said first and second ends of said second terminal connector projecting in directions A and B respectively, where A and B define an angle less than 180°, g) there being L-shaped housing means for said second terminal connector having housing extents projecting in said A and B directions, said housing means including a housing cap removably connectible to one of said housing extents to protect the connector end associated therewith, said cap having removable connection to the housing extent projecting in direction B, and said cap having hinge connection to said housing means at a location spaced from said first and second ends of the terminal connector, h) said hinge connection being in substantial alignment with a wall of said housing extent projecting in direction A, when the cap is closed to cover said sideward opening.

10. The combination of claim 9 wherein said angle is about 90°.

11. The combination of claim 9 including said terminal post to which the connector first end is connected, said housing means extending about said connection first end, proximate the terminal post.

12. In apparatus to connect an LED to posts of a printed circuit board, the LED having terminals, the combination comprising a) first terminal connectors having first ends connectible to the LED terminals, and second ends, b) second terminal connectors having first ends connectible to the board posts, and second ends, said first ends and said second ends defining an L-shaped connection, c) a printed circuit board connector unit to telescopically receive the second terminal connectors, d) and cable having opposite ends to which said second ends of the first and second terminal connectors are connectible, e) there being L-shaped housing means for said first and second terminal connectors, said housing means projecting in directions A and B, and including a cap sidewardly facing said second terminal connectors and having hinge connection to a part of said housing means proximate and associated with said first terminal connectors, f) said hinge connection being in substantial alignment with a wall of said housing means projecting in direction A, when the cap is closed to cover said sideward opening.

13. The combination of claim 12 including a panel connector to telescopically receive the first terminal connectors.

14. The combination of claim 13 including an LED lens having spring fingers attached to the LED, and surfaces to mount the panel connector.

15. The combination of claim 12 wherein the said first terminal connector first ends have grip fingers to receive the LED terminals, and said second terminal connector first ends have grip fingers to receive said terminal posts.

16. The combination of claim 13 wherein the panel connector has openings to receive the first terminal connectors, said openings all being alike in cross section.

17. The combination of claim 16 wherein said openings are square in cross section.

* * * * *